United States Patent
Zhou (10) Patent No.: US 12,405,744 B2
(45) Date of Patent: Sep. 2, 2025

(54) DATA STORAGE METHOD AND FLASH DEVICE FOR ALLOCATING A PHYSICAL ADDRESS BASED ON A FLASH TRANSLATION LAYER

(71) Applicant: Huawei Technologies Co., Ltd., Shenzhen (CN)

(72) Inventor: Jianhua Zhou, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/570,958

(22) Filed: Jan. 7, 2022

(65) Prior Publication Data
US 2022/0129189 A1 Apr. 28, 2022

Related U.S. Application Data

(63) Continuation of application No. PCT/CN2020/095985, filed on Jun. 12, 2020.

(30) Foreign Application Priority Data

Jul. 10, 2019 (CN) .......................... 201910621770.0

(51) Int. Cl.
*G06F 3/00* (2006.01)
*G06F 3/06* (2006.01)
*G06F 12/06* (2006.01)

(52) U.S. Cl.
CPC .......... *G06F 3/0655* (2013.01); *G06F 3/0604* (2013.01); *G06F 3/0679* (2013.01); *G06F 12/06* (2013.01); *G06F 2212/7201* (2013.01)

(58) Field of Classification Search
CPC .... G06F 3/0655; G06F 3/0604; G06F 3/0679; G06F 12/06; G06F 2212/7201
See application file for complete search history.

(56) References Cited

U.S. PATENT DOCUMENTS 10,222,984 B1 3/2019 O'Brien, III et al.
2006/0179212 A1 8/2006 Kim et al.
(Continued)

FOREIGN PATENT DOCUMENTS

CN 102521144 A 6/2012
CN 102591589 A 7/2012
(Continued)

OTHER PUBLICATIONS

Hyun-Seob Lee et al., "HFTL: Hybrid Flash Translation Layer based on Hot Data Identification for Flash Memory," EEE Transactions on Consumer Electronics, vol. 55, No. 4, Nov. 2009, 7 pages.
Junjie Wang, "Research on the algorithm of Flash Translation Layer," Computer Application Technology, Apr. 2013, with a partial machine translation, 87 pages.
(Continued)

*Primary Examiner* — Reginald G Bragdon
*Assistant Examiner* — Michael L Westbrook
(74) *Attorney, Agent, or Firm* — Conley Rose, P.C.

(57) ABSTRACT

A data storage method in a flash device and a flash device, where the flash device includes a plurality of flash translation layers (FTLs), each of the FTLs records a mapping from a logical address to a flash physical address, and granularities of logical addresses of the FTLs are different. After receiving a write operation request, the flash device selects a target FTL from the FTLs based on the received write operation request and allocates a physical address from the flash device to the received write operation request based on the target FTL.

20 Claims, 2 Drawing Sheets

(56) References Cited

U.S. PATENT DOCUMENTS

| | | | | |
|---|---|---|---|---|
| 2008/0189490 | A1* | 8/2008 | Cheon | G06F 12/0246 711/144 |
| 2011/0222330 | A1* | 9/2011 | Lee | G11C 13/0004 365/100 |
| 2012/0124276 | A1* | 5/2012 | Ahn | G06F 12/0246 711/E12.008 |
| 2012/0317377 | A1 | 12/2012 | Palay et al. | |
| 2014/0122861 | A1* | 5/2014 | El Maghraoui | G06F 12/0246 713/100 |
| 2016/0057653 | A1 | 2/2016 | Xu et al. | |
| 2016/0291869 | A1* | 10/2016 | Yi | G06F 3/061 |
| 2017/0235488 | A1 | 8/2017 | Call et al. | |

FOREIGN PATENT DOCUMENTS

| | | |
|---|---|---|
| CN | 103440206 A | 12/2013 |
| CN | 103777905 A | 5/2014 |
| CN | 104102591 A | 10/2014 |
| CN | 105760776 A | 7/2016 |
| CN | 107943719 A | 4/2018 |
| CN | 108628552 A | 10/2018 |
| CN | 110471861 A | 11/2019 |

OTHER PUBLICATIONS

Zhang Jianquan, "Research on the Construction and Performance Optimization of Software-defined Flash Storage System," Huazhong University of Science and Technology, Nov. 2018, with an English abstract, 119 pages.

Wang Fakuan, "Research on the Design of NAND Flash-based Hybrid Solid State Drive," Hangzhou University of Electronic Science and Technology, Feb. 2017, with an English abstract, 64 pages.

Yao Lei, "Study on Flash Translation Layer Mechanism for TLC/SLC Dual-mode Flash Memory in Embedded Systems," Chongqing University, Apr. 2017, with an English abstract, 56 pages.

Chin-Hsien Wu et al., "An Adaptive Two-Level Management for the Flash Translation Layer in Embedded Systems," ICCAD"06, Nov. 5-9, 2006, 6 pages.

Dawoon Jung et al., "Superblock FTL: A Superblock-Based Flash Translation Layer with a Hybrid Address Translation Scheme," ACM Transactions on Embedded Computing Systems, vol. 9, No. 4, Article 40, Mar. 2010, 41 pages.

Yong-Goo Lee et al.,"µ-FTL: A Memory-Efficient Flash Translation Layer Supporting Multiple Mapping Granularities", EMSOFT, Oct. 19-24, 2008, 10 pages.

* cited by examiner

DATA STORAGE METHOD AND FLASH DEVICE FOR ALLOCATING A PHYSICAL ADDRESS BASED ON A FLASH TRANSLATION LAYER

CROSS-REFERENCE TO RELATED APPLICATIONS

This application is a continuation application of International Patent Application No. PCT/CN2020/095985 filed on Jun. 12, 2020, which claims priority to Chinese Patent Application No. 201910621770.0 filed on Jul. 10, 2019. The disclosures of the aforementioned applications are hereby incorporated by reference in their entireties.

TECHNICAL FIELD

Embodiments of this application relate to the field of data storage technologies, and in particular, to a data storage method in a flash device and a flash device.

BACKGROUND

Because a flash device has a special data read/write characteristic, an operating system cannot directly manage the flash device. A flash translation layer (FTL) is disposed between the operating system and the flash device. When a user accesses data in the flash device, after receiving an access request, the operating system first queries the FTL to determine a storage location of the data, then obtains the data from a corresponding storage location, and finally responds to the access request of the user. To ensure a response speed of the flash device, a current FTL is mainly stored in memory space.

Usually, an FTL with a comparatively fine granularity is used. A 512-byte mapping granularity is used as an example. To be specific, each FTL mapping unit corresponds to a 512-byte logical address. When writing new data, the user may directly search for new physical space for storage, and modify a corresponding FTL mapping unit to map, to a new physical address, a logical address corresponding to the FTL mapping unit.

The FTL with a comparatively fine granularity is used. Because the granularity is comparatively small, a mapping ratio between the flash device and a memory is comparatively small. The 512-byte mapping granularity is used as an example. A corresponding mapping ratio is 125. To be specific, a 1-gigabyte (GB) memory can be mapped to only a 125-GB flash device. Therefore, the FTL with a comparatively fine granularity corresponds to comparatively large memory overheads, and it is difficult to meet a memory requirement of a large-capacity flash device. With rapid development of the large-capacity flash device, a memory capacity will limit development of the large-capacity flash device.

SUMMARY

To resolve the foregoing technical problem, embodiments of this application provide a data storage method in a flash device and a flash device, which may provide a plurality of types of FTLs with different granularities, and flexibly configure a granularity of a logical address, to reduce memory overheads and maximize capacity space of a flash device that may be supported by a memory.

According to a first aspect, an embodiment of this application provides a data storage method in a flash device. The flash device includes a plurality of types of FTLs, each of the plurality of types of FTLs is used to record a mapping from a logical address to a flash physical address, and granularities of logical addresses of the plurality of types of FTLs are different. The data storage method includes, first, receiving a write operation request, then, selecting a target FTL from the plurality of types of FTLs based on the received write operation request, and finally, allocating a physical address from the flash device to the received write operation request based on the selected target FTL.

It can be learned from the technical solution of the first aspect that the technical solution has the following advantages. The flash device includes the plurality of types of FTLs, each of the plurality of types of FTLs is used to record the mapping from a logical address to a flash physical address, and the granularities of the logical addresses of the plurality of types of FTLs are different. In addition, the target FTL is selected from the plurality of types of FTLs based on the received write operation request, and the physical address is allocated from the flash device to the received write operation request based on the selected target FTL. Therefore, a plurality of types of FTLs with different granularities may be provided, and a granularity of a logical address may be flexibly configured, to reduce memory overheads and maximize capacity space of a flash device that may be supported by a memory.

In some possible implementations of the first aspect, selecting a target FTL from the plurality of types of FTLs based on the received write operation request may include selecting the target FTL from the plurality of types of FTLs based on at least one of an input/output (I/O) size of the write operation request, a data type carried in the write operation request, a service type for sending the write operation request, or modification frequency of data in a logical address corresponding to the write operation request. In this possible implementation, the I/O size of the write operation request, the data type carried in the write operation request, the service type for sending the write operation request, or the modification frequency of the data in the logical address corresponding to the write operation request are used as a basis for selecting the target FTL. A suitable target FTL may be more accurately selected for the write operation request, to implement proper allocation of a physical address of the flash device and maximize capacity space of the flash device.

In some possible implementations of the first aspect, if the target FTL is selected based on the I/O size of the write operation request, the following manner may be used: separately comparing the I/O size of the write operation request with write data size ranges corresponding to the granularities of the logical addresses of the plurality of types of FTLs, where the write data size ranges corresponding to the granularities of the logical addresses of the FTLs are different, and using, as the target FTL, an FTL corresponding to a write data size range that the I/O size of the write operation request meets. It should be understood that a write data size range may be set based on a granularity of a logical address of an FTL, and the granularity is a storage space size. In this possible implementation, the write data size ranges corresponding to the granularities of the logical addresses of the plurality of types of FTLs are set, and the target FTL is selected based on the set write data size ranges, to implement an implementation in which the target FTL is selected based on the I/O size of the write operation request. In this implementation, rationality and accuracy of the target FTL may be improved.

In some possible implementations of the first aspect, allocating a physical address from the flash device to the write operation request based on the target FTL may include allocating the physical address from the flash device to the write operation request based on a granularity of a flash physical address mapped by the target FTL. The granularity of the flash physical address mapped by the target FTL may be a fine granularity, for example, a 512-byte or 1-kilobyte (KB) mapping granularity, or may be a coarse granularity, for example, a 4-KB or 8-KB mapping granularity. An FTL mapping granularity may be an integer multiple of a sector size (a typical value is 512 bytes). In this possible implementation, the physical address is allocated from the flash device based on FTLs with different granularities, so that storage space in the flash device is properly allocated by using the FTLs with different granularities.

In some possible implementations of the first aspect, the data storage method may further include, after the physical address is allocated to the write operation request, recording, in the target FTL, a mapping relationship between the logical address of the write operation request and the physical address allocated from the flash device. The logical address may be a logical block address (LBA), and the physical address may be a physical page address (PPA). In this possible implementation, the mapping relationship between the logical address of the write operation request and the physical address allocated from the flash device is recorded in the target FTL, so that when an access request for accessing the logical address is received next time, a corresponding physical address may be quickly queried, to implement a quick response to the access request.

According to a second aspect, an embodiment of this application provides a flash device. The flash device includes a plurality of types of FTLs, each of the plurality of types of FTLs is used to record a mapping from a logical address to a flash physical address, and granularities of logical addresses of the plurality of types of FTLs are different. The flash device includes a receiving module, configured to receive a write operation request, a selection module, configured to select a target FTL from the plurality of types of FTLs based on the write operation request, and a management module, configured to allocate a physical address from the flash device to the write operation request based on the target FTL.

In the second aspect of this application, a composition module of the flash device may further perform the steps described in the possible implementations of the first aspect. For details, refer to the descriptions in the first aspect and the possible implementations. Details are not described herein again.

According to a third aspect, an embodiment of this application provides a computer program product including instructions. When the computer program product runs on a computer, the computer is enabled to perform the method according to the first aspect.

According to a fourth aspect, an embodiment of this application provides a computer-readable storage medium. The computer-readable storage medium stores instructions, and when the instructions are run on a computer, the computer is enabled to perform the method according to the first aspect.

According to a fifth aspect, an embodiment of this application provides a flash device. The flash device includes a plurality of types of FTLs, each of the plurality of types of FTLs is used to record a mapping from a logical address to a flash physical address, and granularities of logical addresses of the plurality of types of FTLs are different. The flash device includes a processor and a storage medium, and the processor communicates with the storage medium. The storage medium is configured to store an operation instruction, and the processor is configured to invoke the operation instruction to perform the method according to the first aspect or any one of the implementations of the first aspect.

DESCRIPTION OF EMBODIMENTS

Embodiments of this application provide a data storage method in a flash device and a flash device, which may provide a plurality of types of FTLs with different granularities, and flexibly configure a granularity of a logical address, to reduce memory overheads and maximize capacity space of a flash device that may be supported by a memory.

The following describes the embodiments of this application with reference to accompanying drawings.

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, and this is merely a discrimination manner for describing objects having a same attribute in the embodiments of this application. In addition, the terms "include", "contain" and any other variants mean to cover the non-exclusive inclusion, so that a process, method, system, product, or device that includes a series of units is not necessarily limited to those units, but may include another unit not expressly listed or inherent to such a process, method, system, product, or device.

A data storage method in a flash device in this embodiment of this application is applicable to a flash device, for example, a NAND flash chip or a solid-state drive (SSD) that uses the NAND flash chip as a storage medium.

To facilitate understanding of the data storage method in the embodiments of this application, the following provides detailed descriptions with reference to specific embodiments.

Figure 1:
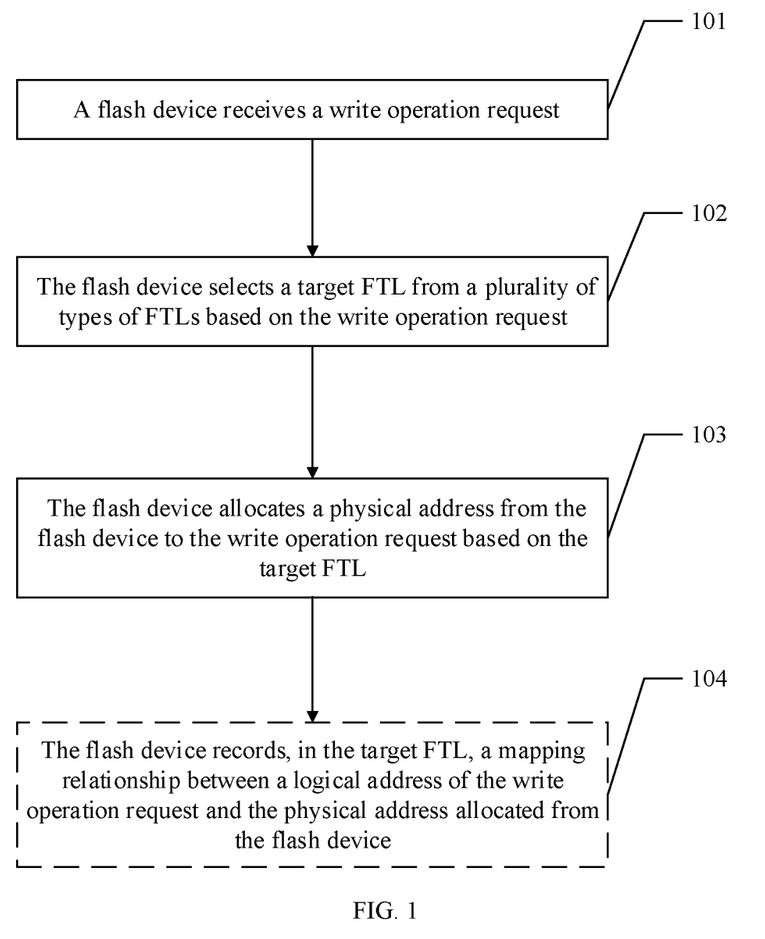
FIG. 1 is a schematic diagram of an embodiment of a data storage method in a flash device according to an embodiment of this application.

FIG. 1 is a schematic diagram of an embodiment of a data storage method in a flash device according to an embodiment of this application.

As shown in FIG. 1, the data storage method in the flash device in this embodiment of this application includes the following steps.

101: A flash device receives a write operation request.

The flash device receives the write operation request. The write operation request may be generated and sent by an operating system based on an access request of a user after the user initiates the access request.

The flash device described in this embodiment of this application includes a plurality of types of FTLs, each of the plurality of types of FTLs is used to record a mapping from a logical address to a flash physical address, and granularities of logical addresses of the plurality of types of FTLs are different. The plurality of types of FTLs are located in a memory. It should be understood that a granularity of a logical address of an FTL is a size of a logical block in the FTL.

For example, if the granularity of the logical address of the FTL is 4 KB, a size of a logical block corresponding to one FTL mapping unit or FTL mapping entry is 4 KB, and one FTL mapping entry occupies 32-bit (that is, 4 bytes) memory space in a memory. Correspondingly, the granularity of the logical address of the FTL may alternatively be 512 bytes, 8 KB, 16 KB, or the like. In this embodiment of this application, the granularity of the logical address of the FTL may be an integer multiple of a sector size (for example, 512 bytes).

For FTLs with logical addresses of different granularities, a larger granularity of a logical address of an FTL indicates a larger logical block, fewer FTL mapping entries, and smaller occupied memory space. A smaller granularity of a logical address of an FTL indicates a smaller logical block, more FTL mapping entries, and larger occupied memory space. For example, granularities of logical addresses of FTLs are respectively 4 KB and 8 KB. If written data is 16 KB, and the FTL with the logical address whose granularity is 4 KB is used, four FTL mapping entries are required for mapping. For example, one FTL mapping entry is 32 bits. In this case, memory space correspondingly occupied by the written data is 128 bits. If the FTL with the logical address whose granularity is 8 KB is used, only two FTL mapping entries are required for mapping. For example, one FTL mapping entry is 32 bits. In this case, memory space correspondingly occupied by the written data is 64 bits, thereby reducing memory overheads by half.

102: The flash device selects a target FTL from the plurality of types of FTLs based on the write operation request.

The flash device selects the target FTL from the plurality of types of FTLs based on the received write operation request.

In some implementations of this embodiment of this application, the foregoing selection of the target FTL may be based on but is not limited to selecting the target FTL from the plurality of types of FTLs based on at least one of an I/O size of the write operation request, a data type carried in the write operation request, a service type for sending the write operation request, or modification frequency of data in a logical address corresponding to the write operation request.

Further, three types of FTLs are used as an example. A granularity of a logical address of a first FTL is 512 bytes. A granularity of a logical address of a second FTL is 4 KB. A granularity of a logical address of a third FTL is 8 KB. Target FTL selection manners may include but are not limited to the following several types:

(1) A first target FTL selection manner: The target FTL is selected based on the I/O size of the write operation request.

The I/O size of the write operation request is separately compared with write data size ranges corresponding to the granularities of the logical addresses of the plurality of types of FTLs, where the write data size ranges corresponding to the granularities of the logical addresses of the FTLs are different. An FTL corresponding to a write data size range that the I/O size of the write operation request meets is used as the target FTL.

For example, a write data size range corresponding to the granularity of the logical address of the first FTL is less than or equal to 512 bytes. A write data size range corresponding to the granularity of the logical address of the second FTL is greater than 512 bytes and less than or equal to 4 KB. A write data size range corresponding to the granularity of the logical address of the third FTL is greater than 4 KB. It is easy to understand that when the I/O size of the write operation request is less than or equal to 512 bytes, the first FTL with the logical address whose granularity is 512 bytes is selected as the target FTL. When the I/O size of the write operation request is greater than 512 bytes and less than or equal to 4 KB, the second FTL with the logical address whose granularity is 4 KB is selected as the target FTL. When the I/O size of the write operation request is greater than 4 KB, the third FTL with the logical address whose granularity is 8 KB is selected as the target FTL.

(2) A second target FTL selection manner: the target FTL is selected based on the data type carried in the write operation request.

Data types are metadata and user data. It can be learned from experience that a modification unit corresponding to the metadata usually has a small granularity (for example, 512 bytes) and is frequently modified, whereas a modification unit corresponding to the user data usually has a comparatively large granularity (for example, 8 KB). If the data type is the metadata, the first FTL with the logical address whose granularity is 512 bytes is selected as the target FTL. If the data type is the user data, the third FTL with the logical address whose granularity is 8 KB is selected as the target FTL.

(3) A third target FTL selection manner: the target FTL is selected based on the service type for sending the write operation request.

For example, three service types are used: a video recording service, a log online service, and an online transaction service. Usually, the video recording service usually corresponds to large I/O, such as 1 megabyte (MB). The log online service usually corresponds to small I/O, such as 512 bytes. The online transaction service usually corresponds to large I/O, such as 8 KB. For the video recording service and the online transaction service, the third FTL with the logical address whose granularity is 8 KB is selected as the target FTL. For the log online service, the first FTL with the logical address whose granularity is 512 bytes is selected as the target FTL.

(4) A fourth target FTL selection manner: the target FTL is selected based on the modification frequency of the data in the logical address corresponding to the write operation request.

Cold data and hot data are used as an example. The cold data refers to data whose corresponding data modification frequency is lower than a threshold, and a data activity degree of the cold data is comparatively low. The hot data refers to data whose corresponding data modification frequency is higher than the threshold, and a data activity degree of the hot data is comparatively high. For the cold data with a comparatively low data activity degree, the third FTL with the logical address whose granularity is 8 KB may be selected as the target FTL, or the second FTL with the logical address whose granularity is 4 KB may be selected as the target FTL. For the hot data with a comparatively high data activity degree, the first FTL with the logical address whose granularity is 512 bytes may be selected as the target FTL.

103: The flash device allocates a physical address from the flash device to the write operation request based on the target FTL.

The allocating a physical address from the flash device to the write operation request based on the target FTL may include but is not limited to allocating the physical address from the flash device to the write operation request based on a granularity of a flash physical address mapped by the target FTL.

Further, if the target FTL is the first FTL with the logical address whose granularity is 512 bytes, the physical address is allocated to the write operation request by using a mapping relationship in which one FTL mapping entry corresponds to a 512-byte logical block. If the target FTL is the second FTL with the logical address whose granularity is 4 KB, the physical address is allocated to the write operation request by using a mapping relationship in which one FTL mapping entry corresponds to a 4-KB logical block. If the target FTL is the third FTL with the logical address whose granularity is 8 KB, the physical address is allocated to the write operation request by using a mapping relationship in which one FTL mapping entry corresponds to an 8-KB logical block.

The logical block may be an LBA, and the physical address may be a PPA. The LBA is a logical address or logical space in the flash device. The PPA is a physical address or physical space in the flash device. That the flash device allocates a physical address from the flash device to the write operation request based on the target FTL may be that the flash device allocates memory space to the write operation request based on a granularity of a logical address of the target FTL, and an LBA to which the memory space is mapped is converted to a PPA in the flash device.

Optionally, 104. The flash device records, in the target FTL, a mapping relationship between the logical address of the write operation request and the physical address allocated from the flash device.

After the physical address is allocated to the write operation request, the mapping relationship between the logical address of the write operation request and the physical address allocated from the flash device is recorded in the target FTL. Further, the flash device adds a new mapping entry to a mapping table corresponding to the target FTL, and the newly-added mapping entry is used to record a correspondence between an LBA and a PPA that are in the write operation request.

In this embodiment of this application, the plurality of types of FTLs are disposed in the flash device, each of the plurality of types of FTLs is used to record the mapping from a logical address to a flash physical address, and the granularities of the logical addresses of the plurality of types of FTLs are different. In addition, the target FTL is selected from the plurality of types of FTLs based on the received write operation request, and the physical address is allocated from the flash device to the received write operation request based on the selected target FTL. Therefore, the technical solution in this application may provide a plurality of types of FTLs with different granularities, and flexibly configure a granularity of a logical address, to reduce memory overheads and maximize capacity space of a flash device that may be supported by a memory.

Further, compared with an existing single FTL management granularity, in this embodiment of this application, a plurality of manners of accessing FTLs with logical addresses of different granularities may be provided simultaneously in a same flash device, such as a mapping area with a fine granularity (each FTL mapping entry corresponds to a logical address of 512-byte data), and a mapping area with a coarse granularity (each FTL mapping entry corresponds to a logical address of 8-KB data). Data is stored in the mapping area with a fine granularity, and corresponding content is directly modified during actual modification. A ratio between an actual write data volume and a user-required write data volume, that is, a write amplification factor (WAF) is quite small, and an actual response speed is quite high. In addition, wear on the flash device is as low as possible, thereby prolonging a service life of the flash device. The user data is stored in the mapping area with a coarse granularity, which reduces a quantity of FTL mapping entries and memory space, so that a flash device with a larger capacity may be mapped under a limited memory capacity.

It should be noted that, for brief description, the foregoing method embodiments are represented as a series of actions. However, a person skilled in the art should appreciate that this application is not limited to the described order of the actions, because according to this application, some steps may be performed in another order or simultaneously. It should be further appreciated by a person skilled in the art that the embodiments described in this specification, and the involved actions and modules are not necessarily required by this application.

To better implement the foregoing solutions in the embodiments of this application, the following further provides a related apparatus for implementing the foregoing solutions.

Figure 2:
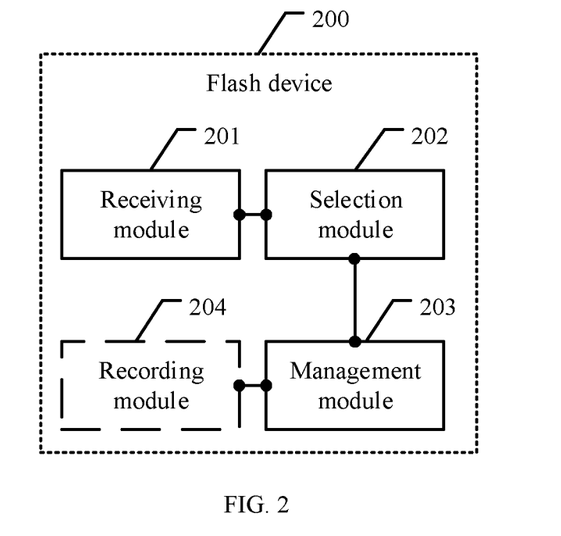
FIG. 2 is a schematic structural diagram of composition of a flash device according to an embodiment of this application.

FIG. 2 is a schematic structural diagram of composition of a flash device according to an embodiment of this application.

A flash device 200 includes a receiving module 201, a selection module 202, and a management module 203. The flash device 200 includes a plurality of types of FTLs, each of the plurality of types of FTLs is used to record a mapping from a logical address to a flash physical address, and granularities of logical addresses of the plurality of types of FTLs are different. The receiving module 201 is configured to receive a write operation request. The selection module 202 is configured to select a target FTL from the plurality of types of FTLs based on the received write operation request. The management module 203 is configured to allocate a physical address from the flash device to the received write operation request based on the selected target FTL.

In some implementations of this embodiment of this application, the selection module 202 is configured to select the target FTL from the plurality of types of FTLs based on at least one of an I/O size of the write operation request, a data type carried in the write operation request, a service type for sending the write operation request, or modification frequency of data in a logical address corresponding to the write operation request.

In some implementations of this embodiment of this application, the selection module 202 is configured to separately compare the I/O size of the write operation request with write data size ranges corresponding to the granularities of the logical addresses of the plurality of types of FTLs, where the write data size ranges corresponding to the granularities of the logical addresses of the FTLs are different. An FTL corresponding to a write data size range that the I/O size of the write operation request meets is used as the target FTL.

In some implementations of this embodiment of this application, the management module 203 is configured to allocate the physical address from the flash device to the write operation request based on a granularity of a flash physical address mapped by the target FTL.

In some implementations of this embodiment of this application, the flash device 200 further includes a recording module 204. The recording module 204 is configured to, after the physical address is allocated to the write operation request, record, in the target FTL, a mapping relationship between the logical address of the write operation request and the physical address allocated from the flash device.

It should be noted that all steps and operations performed by the flash device in the foregoing method embodiments may be performed by reference to each component module of the flash device 200. Beneficial effects achieved by the flash device 200 in this embodiment of this application are similar to those described in the foregoing method embodiments. For detailed descriptions of the beneficial effects, refer to descriptions of related parts in the foregoing method embodiments. Details are not described herein again.

It should be further noted that content such as information exchange between the modules/units of the apparatus and the execution processes thereof is based on a same idea as the method embodiments of this application, and produces same technical effects as the method embodiments of this application. For the specific content, refer to the foregoing description in the method embodiments of this application. Details are not described herein again.

An embodiment of this application further provides a computer storage medium. The computer storage medium stores a program, and the program performs some or all of the steps described in the foregoing method embodiments.

The following describes a flash device with another structure provided in this embodiment of this application.

Figure 3:
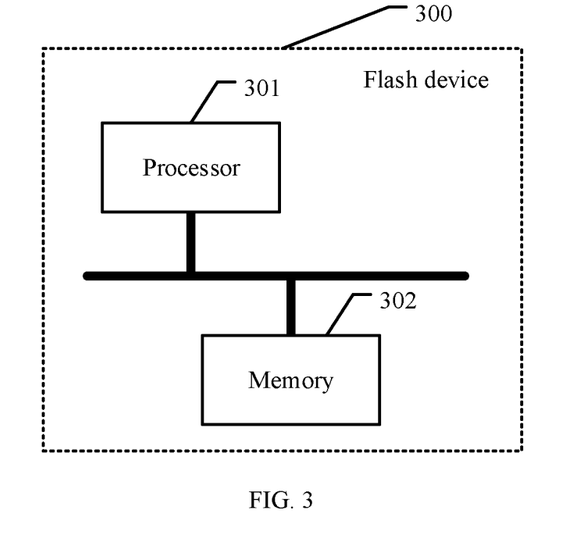
FIG. 3 is a schematic structural diagram of composition of a flash device according to an embodiment of this application.

FIG. 3 is another schematic structural diagram of composition of a flash device according to an embodiment of this application.

As shown in FIG. 3, a flash device 300 includes a processor 301 and a memory 302. There may be one or more processors 301. One processor is used as an example in FIG. 3.

The memory 302 may include a read-only memory (ROM) and a random-access memory (RAM), and provide instructions and data to the processor 301. Apart of the memory 302 may further include a non-volatile RAM (NVRAM). The memory 302 stores an operation instruction, an executable module or a data structure, or a subset thereof, or an extended set thereof.

The processor 301 controls an operation of the flash device, and the processor 301 may also be referred to as a central processing unit (CPU). In specific application, components of the flash device are coupled together through a bus system. In addition to a data bus, the bus system may include a power bus, a control bus, a status signal bus, and the like. However, for clear description, various types of buses in the figure are marked as the bus system.

The method disclosed in the embodiments of this application may be applied to the processor 301, or implemented by the processor 301. The processor 301 may be an integrated circuit chip and has a signal processing capability. In an implementation process, steps in the foregoing method may be implemented by using a hardware integrated logic circuit in the processor 301, or by using instructions in a form of software. The processor 301 may be a general purpose processor, a digital signal processor (DSP), an application-specific integrated circuit (ASIC), a field-programmable gate array (FPGA) or another programmable logic device, a discrete gate or transistor logic device, or a discrete hardware component. The processor 301 may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly performed and accomplished by a hardware decoding processor, or may be performed and accomplished by using a combination of hardware and software modules in the decoding processor. A software module may be located in a mature storage medium in the art, such as a RAM, a flash memory, a ROM, a programmable ROM (PROM), an electrically erasable PROM (EEPROM), or a register. The storage medium is located in the memory 302, and the processor 301 reads information in the memory 302 and completes the steps in the foregoing methods in combination with hardware of the processor.

In another possible design, a chip includes a processing unit and a communications unit. The processing unit may be, for example, a processor, and the communications unit may be, for example, an I/O interface, a pin, or a circuit. The processing unit may execute a computer-executable instruction stored in a storage unit, so that a chip in the terminal performs the data storage method according to any one implementation of the first aspect. Optionally, the storage unit is a storage unit in the chip, for example, a register or a cache. Alternatively, the storage unit may be a storage unit that is in the terminal and that is located outside the chip, for example, a ROM or another type of static storage device that may store static information and instructions, such as a RAM.

Any one of the foregoing processors may be a general purpose central processing unit, a microprocessor, an ASIC, an FPGA, a complex programmable logic device (CPLD), or one or more integrated circuits configured to control program execution of the method in the first aspect.

In addition, it should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected based on actual needs to achieve the objectives of the solutions of the embodiments. In addition, in the accompanying drawings of the apparatus embodiments provided in this application, connection relationships between modules indicate that the modules have communication connections with each other, which may be implemented as one or more communications buses or signal cables.

Based on the description of the foregoing implementations, a person skilled in the art may clearly understand that this application may be implemented by software in addition to necessary commodity hardware, or by dedicated hardware, including an ASIC, a dedicated CPU, a dedicated memory, a dedicated component, and the like. Usually, any function that is performed by a computer program may be easily implemented by using corresponding hardware. In addition, a specific hardware structure used to achieve a same function may be of various forms, for example, in a form of an analog circuit, a digital circuit, or a private circuit. However, for this application, software program implementation is better in most cases. Based on such an understanding, the technical solutions of this application essentially or the part contributing to the conventional technology may be implemented in a form of a software product. The computer software product is stored in a readable storage medium, such as a floppy disk, a Universal Serial Bus (USB) flash drive, a removable hard disk, a ROM, a RAM, a magnetic disk, or a compact disc (CD) of a computer, and includes a plurality of instructions for instructing a computer device (which may be a personal computer, a server, or a network device) to perform the method described in the embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, an SSD), or the like.

What is claimed is:

1. A data storage method of a flash device, wherein the data storage method comprises:
   receiving a write operation request;
   selecting a target flash translation layer (FTL) from a plurality of types of FTLs in the flash device based on a service type for sending the write operation request, wherein the service type comprises a video recording service, a log online service, or an online transaction service, wherein a granularity of an input/output (I/O) size of a logical address of the FTL is based on the service type, wherein each of the FTLs records a mapping from the logical address to a flash physical address, wherein granularities of logical addresses of the plurality of types of FTLs are different, and wherein each granularity of the granularities of the plurality of types of FTLs is separately configured based on an integer multiple of a sector size of the flash physical address; and
   allocating based on the target FTL, a physical address from the flash device to the write operation request.

2. The data storage method of claim 1, further comprising selecting the target FTL from the FTLs based on an I/O size of the write operation request.

3. The data storage method of claim 2, further comprising determining a first FTL in the FTLs as the target FTL, wherein the I/O size of the write operation request is within a write data size range corresponding to a granularity of a logical address of the first FTL, and wherein write data size ranges corresponding to the granularities of the logical addresses of the FTLs are different.

4. The data storage method of claim 1, further comprising allocating the physical address from the flash device to the write operation request based on a granularity of a flash physical address mapped by the target FTL.

5. The data storage method of claim 1, further comprising recording, in the target FTL, a mapping relationship between the logical address of the write operation request and the physical address allocated from the flash device.

6. The data storage method of claim 1, further comprising further selecting the target FTL from the FTLs based on a data type carried in the write operation request.

7. The data storage method of claim 1, further comprising further selecting the target FTL from the FTLs based on a modification frequency of data in a logical address corresponding to the write operation request.

8. A flash device comprising:
   a non-transitory storage medium configured to store computer-executable instructions; and
   a processor coupled to the non-transitory storage medium and configured to execute the computer-executable instructions that cause the flash device to:
      receive a write operation request;
      select a target flash translation layer (FTL) from a plurality of types of FTLs in the flash device based on a service type of the write operation request, wherein the service type comprises a video recording service, a log online service, or an online transaction service, wherein a granularity of an input/output (I/O) size of a logical address of the FTL is based on the service type, wherein each of the FTLs records a mapping from the logical address to a flash physical address, wherein granularities of logical addresses of the plurality of types of FTLs are different, and wherein each granularity of the granularities of each of the plurality of types of FTLs is separately configured based on an integer multiple of a sector size of the flash physical address; and
      allocate, based on the target FTL, a physical address from the flash device to the write operation request.

9. The flash device of claim 8, wherein the computer-executable instructions further cause the flash device to be configured to select the target FTL from the FTLs based on an I/O size of the write operation request.

10. The flash device of claim 9, wherein the computer-executable instructions further cause the flash device to be configured to determine a first FTL in the FTLs as the target FTL, wherein the I/O size of the write operation request is within a write data size range corresponding to a granularity of a logical address of the first FTL, and wherein write data size ranges corresponding to the granularities are different.

11. The flash device of claim 8, wherein the computer-executable instructions further cause the flash device to be configured to allocate the physical address from the flash device to the write operation request based on a granularity of a flash physical address mapped by the target FTL.

12. The flash device of claim 8, wherein the computer-executable instructions further cause the flash device to be configured to record, in the target FTL, a mapping relationship between the logical address of the write operation request and the physical address allocated from the flash device.

13. The flash device of claim 8, wherein the computer-executable instructions further cause the flash device to be configured to further select the target FTL from the FTLs based on a data type carried in the write operation request.

14. The flash device of claim 8, wherein the computer-executable instructions further cause the flash device to be configured to further select the target FTL from the FTLs based on a modification frequency of data in a logical address corresponding to the write operation request.

15. A computer program product comprising computer-executable instructions that are stored on a non-transitory computer-readable storage medium and that, when executed by a processor, cause a flash device to:

receive a write operation request;

select a target flash translation layer (FTL) from a plurality of FTLs in the flash device based on a service type of the write operation request, wherein the service type comprises a video recording service, a log online service, or an online transaction service, wherein a granularity of an input/output (I/O) size of a logical address of the FTL is based on the service type, wherein each of the FTLs records a mapping from the logical address to a flash physical address, wherein granularities of logical addresses of the plurality of types of FTLs are different, and wherein each granularity of the granularities of the plurality of types of FTLs is separately configured based on an integer multiple of a sector size of the flash physical address; and allocate, based on the target FTL, a physical address from the flash device to the write operation request.

16. The computer program product of claim 15, wherein the computer-executable instructions further cause the flash device to further select the target FTL from the FTLs based on an I/O size of the write operation request.

17. The computer program product of claim 16, wherein the computer-executable instructions further cause the flash device to determine a first FTL in the FTLs as the target FTL, wherein the I/O size of the write operation request is within a write data size range corresponding to a granularity of a logical address of the first FTL, and wherein write data size ranges corresponding to the granularities are different.

18. The computer program product of claim 15, wherein the computer-executable instructions further cause the flash device to further allocate the physical address from the flash device to the write operation request based on a granularity of a flash physical address mapped by the target FTL.

19. The computer program product of claim 15, wherein the computer-executable instructions further cause the flash device to record, in the target FTL, a mapping relationship between the logical address of the write operation request and the physical address allocated from the flash device.

20. The computer program product of claim 15, wherein the computer-executable instructions further cause the flash device to further select the target FTL from the FTLs based on at least one of a data type carried in the write operation request, or modification frequency of data in a logical address corresponding to the write operation request.

* * * * *